United States Patent [19]

Rozenfeld et al.

[11] 4,404,167
[45] Sep. 13, 1983

[54] PROTECTING STEEL AND FERROUS METALS AGAINST H₂S CORROSION

[76] Inventors: Iosif L. Rozenfeld, ulitsa Gubkina, 4, kv. 96; Vera M. Brusnikina, Teply Stan, Mikroraion 9B, korpus 7, kv. 262; Larisa V. Frolova, Perekopskaya ulitsa, 18, kv. 80; Alevtina A. Lyashenko, Shelepikhinskoe shosse, 17, korpus 1, kv. 86; Jury V. Sokolov, ulitsa Shabolovka, 21, korpus 3, kv. 117; Böris V. Bocharov, Teply Stan, 9B, korpus D, kv. 148; Alexandr V. Fokin, Bolshoi Rzhevsky pereulok, 11, kv. 14; Nikolai E. Legezin, 9 Parkovaya ulitsa, 6, korpus 1, kv. 85, all of Moscow; Ekaterina V. Dergobuzova, ulitsa Sovetskaya, 10, kv. 59, Vidnoe Moskovskoi oblasti; Boris N. Altshuler, Kerchenskaya ulitsa, 24, kv. 119, Moscow; Saida A. Zelenaya, ulitsa Lermontova, 11, kv. 13; Emma S. Korobova, ulitsa Lenina, 66, kv. 25, both of Volgodonsk Rostovskoi oblasti, all of U.S.S.R.

[21] Appl. No.: 246,270

[22] Filed: Mar. 23, 1981

Related U.S. Application Data

[60] Continuation of Ser. No. 38,865, May 14, 1979, abandoned, which is a division of Ser. No. 944,150, Sep. 20, 1978, abandoned.

[51] Int. Cl.³ .................. C23F 11/04; C23F 11/14
[52] U.S. Cl. .................. 422/12; 252/8.55 E; 260/464; 260/465.5 R; 422/7; 422/9; 422/16
[58] Field of Search .................. 422/16, 7, 9, 12; 252/8.55 E

[56] References Cited

U.S. PATENT DOCUMENTS

| | | | |
|---|---|---|---|
| 2,074,380 | 3/1937 | Flett | 252/321 |
| 2,363,923 | 11/1944 | Denman | 252/321 |
| 2,614,980 | 10/1952 | Lytle | 422/7 X |
| 2,614,981 | 10/1952 | Lytle | 422/7 X |
| 2,700,652 | 1/1955 | Menaul | 422/7 |
| 3,069,225 | 12/1962 | Andersen | 422/7 |
| 3,218,351 | 11/1965 | Jolly | 252/8.55 E |
| 3,234,144 | 2/1966 | Morehouse | 252/8.55 E |
| 3,259,586 | 7/1966 | Dickson et al. | 252/321 |
| 3,313,736 | 4/1967 | Dickson et al. | 252/358 X |
| 3,514,251 | 5/1970 | Annand et al. | 422/7 |
| 3,637,341 | 1/1972 | Horton et al. | 422/7 |
| 3,664,807 | 5/1972 | Redmore | 252/8.55 E X |
| 3,876,371 | 4/1975 | Costain | 422/16 X |
| 3,909,200 | 9/1975 | Redmore | 422/16 |
| 3,920,392 | 11/1975 | Harada et al. | 422/7 |
| 3,965,027 | 6/1976 | Boffardi | 422/7 |
| 4,028,055 | 6/1977 | Doi et al. | 252/8.55 E X |
| 4,073,618 | 2/1978 | Doi | 422/16 X |

FOREIGN PATENT DOCUMENTS 866447 4/1961 United Kingdom.
964837 7/1964 United Kingdom.

OTHER PUBLICATIONS

Efimova et al.; "Ekspluatatsiya, Modernizatsiya i remont oborudovaniya (in Russian) Abstract Scientific and Technical Collection, No. 2, 20-22 (1973).
Zuya et al.; Nafta (PRZ), 28, No. 10, pp. 461-463, (1972).
Hausler et al.; Oil and Gas Journal, 70, No. 29, pp. 92-98, (1972).
Tikhomirov, "Foams", Khimiya Publ. House-Moscow, (1975), p. 209.
Mindyuk et al., "Korroziya i Zashchita V. Neftegazovoi, Promishlennosti", in Russian, (Abstract Scientific & Technical Collection), No. 8, 8-9, (1973).
"The Chemistry of Acrylonitrile", 2nd Ed., 1959, American Cyanamid Co., pp. 155-189.
Bruson, "Organic Reactions", vol. 5, (1949), pp. 114-119.
Chemical Abstracts, 94:69726z (1981).

*Primary Examiner*—Sidney Marantz
*Attorney, Agent, or Firm*—Lilling & Greenspan

[57] ABSTRACT

An antifoaming inhibitor of hydrogen sulphide corrosion which is a compound of the general formula:

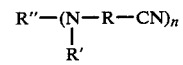

where R is a divalent normal or branched alkyl containing from 1 to 6 carbon atoms,
n=1 or 2;
when n=1
R' and R" are hydrogen or branched alkyl containing from 1 to 20 carbon atoms, normal or branched alkenyl containing from 3 to 14 carbon atoms, oxyalkyl containing from 1 to 20 carbon atoms, cycloalkyl containing from 5 to 6 carbon atoms,
R' and R" are $-(CH_2)_m-$,
where m=2-10, $-(CH_2)_2-NH-(CH_2)_2-$; $-(CH_2)_2-O-(CH_2)_2-$;
when n=2
R' is hydrogen, normal or branched alkyl containing from 1 to 20 carbon atoms, normal or branched alkenyl containing from 3 to 14 carbon atoms,
R' is $-(CH_2)_k$, where k=2-10, $-(CH_2)_2-NH-(CH_2)_2-$.

The proposed inhibitor is effective in acid, weak acid, and alkaline media in a wide range of hydrogen sulphide content. Antifoaming properties of the proposed inhibitor are 7-8 times higher than those of the foam suppressor Rodorsyl 426 A produced by "Rhone-poulenc Chimie fine", France, used in combination with the inhibitor Visco-904 produced by "Nalko", USA.

5 Claims, No Drawings

PROTECTING STEEL AND FERROUS METALS AGAINST H₂S CORROSION

This application is a continuation of application Ser. No. 38,865 filed on May 14, 1979, now abandoned, which is a division of application Ser. No. 944,150, filed on Sept. 20, 1978, now abandoned.

The invention relates to the field of protection of steels and ferrous metals from corrosion and hydrogen absorption in media containing hydrogen sulphide and carbon dioxide.

Field of Application

The present invention will find application in petroleum, gas, and gas-petroleum processing industry for protection of the equipment from corrosion and hydrogen absorption in hydrogen sulphide-containing media.

Many condensed gas deposits contain high concentrations of humid hydrogen sulphide (5–10 wt.%) as well as hydrocarbon and water condensate including dissolved hydrogen sulphide, carbon dioxide, organic and inorganic acids.

Mining of such deposits and processing of petroleum and gas are practically impossible without special protection of the equipment. The most common type of destruction in such media is hydrogen embrittlement, corrosion cracking and disintegration of the metal of the equipment.

Inhibiting protection of steel and ferrous metals from corrosion in hydrogen sulphide-containing media is widely used both in our country and abroad.

High-molecular weight organic amines with open chain carbon atoms, for example, a mixture of aliphatic amines in the form of bases with 15 carbon atoms on the average, or hydrochloric salts of this mixture found the most extensive use as inhibitors (I.A. Mamedov et.al. "Azerbaidzhanskii khimicheskii zhurnal" No. 1, 96-100 (1969); Reis Lucja, Turek Tadeusz, Nafta (PRL) 28, No. 10, pp. 461–463 (1972), P. H. Hausler, N. D. Coble, Oil and Gas J. 70, No. 29, 92–98 (1972).

Besides, heavy pyridine bases are used extensively as inhibitors (see A. K. Mindyuk, E. I. Svist et.al. "Korroziya i zashchita v neftegazovoi promishlennosti" in Russian, Abstract scientific and technical collection No. 8, 8–9 (1973), as well as condensation products of ethylene oxide, ethylenediamine, and of synthetic fatty acids (A. K. Efimova, V. N. Umutbaev "Ekspluatatsiya, modernizatsiya i remont oborudovaniya" in Russian, Abstract scientific and technical collection No. 2, 20–22 (1973).

Also known are inhibitors which represent a mixture of salts of an amine and sulphated unsaturated fatty acid, ethoxylated propylene glycol, and a solvent (R. H. Hausler and L. A. Coeller, U.S. Pat. No. 3,696,048) as well as a mixture similar in composition to the above in which dicarboxylic acid C₁₀₋₅₀ and an amine with 10–30 carbon atoms are used in combination with an oxyalkylated component, namely, alkylphenols containing from 5 to 15 oxyalkyl groups in the molecule (L. W. Jones, U.S. Pat. No. 3,703,477) or a polymer product of the reaction epichlorohydrin with aliphatic amine (R. H. Hausler and L. A. Coeller, U.S. Pat. No. 3,705,109).

The above-cited inhibitors do not meet all the requirements imposed on corrosion inhibitors for protection of equipment used in oil and gas fields when the products contain hydrogen sulphide. In particular, known inhibitors do not possess the required technological properties (low viscosity, low solidification temperature, high thermal stability) and, in addition, do not protect the equipment of oil and gas fields from corrosion and hydrogen absorption in a gas phase.

Inhibitors based on pyridine compounds, as compared with other known inhibitors, have good protective properties. But they are characterized by low solidification temperature, high viscosity, coke formation, and odor.

Many corrosion inhibitors, being surfactants, cause foaming of the absorbents used in installations for sulphur purification. Therefore, antifoaming compounds, the so called foam suppressors, must be introduced.

As foam suppressors use is usually made of organosilicone compounds, for instance, polymethylsiloxane $(CH_3)_3SiO \cdot [Si(CH_3)_2O\text{-}]_n Si(\text{-}CH_3)_3$ (see V. I. Tikhomirov "Peni" in Russian, Moscow, "Khimiya" Publ. House, 1975, p.209,216). Use is also made of multicomponent compositions such as a mixture of an organosilicone compound and tertiary amine (G. Curtis, U.S. Pat. No. 3,661,793), or a mixture of an organosilicon compound, tertiary alkylamine, and polyoxypropyleneamine acetate (see, for instance, U.S. Pat. No. 3,267,042; 3,384,600; British Pat. No. 964,837).

However, siloxane-based antifoaming agents lose their properties at low temperatures; besides, known foam suppressors including poly-siloxane-based compositions are disadvantageous in that the field of their application is limited, the cost is high, the method of preparation is difficult, and raw material is scarce.

A change in pH and temperature of the medium, as well as an increase in organic and inorganic impurity content under real technological processes often reduces or inhibits completely the action of the above-cited antifoaming agents.

Thus, when the pH of aqueous solutions is less than 7, aliphatic amines with 8–18 carbon atoms (primary, secondary, and tertiary) are used an antifoaming agents with the addition of non-ionic surfactants (W. P. Williams, British Pat. No. 866,447. on 26.06 1959).

The above-cited antifoaming agent is disadvantageous in that it is accumulated in recirculating working solutions which can not only deteriorate antifoaming properties but stimulate foam formation.

It is an object of the invention to eliminate these disadvantages.

It is also an object of the invention to provide an antifoaming inhibitor for hydrogen sulphide corrosion.

Another object of the invention is to provide an inhibitor possessing high protective action from corrosion and hydrogen embrittlement both in liquid and gaseous phases.

Said objects are accomplished with an antifoaming inhibitor of hydrogen sulphide corrosion, which according to the present invention, is a compound of the general formula:

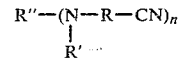

where R is a normal or branched alkyl containing from 1 to 6 carbon atoms,
n=1 or 2;
when n=1 R' and R" are identical or different radicals, namely, hydrogen, normal or branched alkyl with 1–20 carbon atoms, normal or branched alkenyl containing from 3 to 14 carbon atoms, oxyalkyl containing from 1 to 20 carbon atoms, or cycloalkyl containing from 5 to 6 carbon atoms; or R' and R" are -(CH$_2$)$_m$-, where m=2-10, -(CH$_2$)$_2$-NH-(CH$_2$)$_2$-, -(CH$_2$)$_2$-O-(CH$_2$)$_2$-; when N=2 R' is hydrogen, normal or branched alkyl containing from 1 to 20 carbon atoms, normal or branched alkenyl containing from 3 to 14 carbon atoms; R" is -(CH$_2$)$_k$-, where K=2-10, or -(CH$_2$)$_2$-NH-(CH$_2$)$_2$-

The inhibitor proposed in the present invention is effective in acid, weakly acid, and alkaline media in a wide range of hydrogen sulphide content. Antifoaming properties of the proposed inhibitor are 7-8-fold higher than those of the antifoaming agent Rodorsil 426A produced by "Rhonepoulenc chimie fine", France, used in combination with the inhibitor Visco-904 produced by "Nalco", U.S.A.

The properties of the proposed and known inhibitors based on a pyridine compound are compared in Table 1.

TABLE 1

|   | proposed inhibitor | known inhibitor |
|---|---|---|
| 1. Protective concentration in condensate, mg/l | 25 | 500 |
| 2. Rate of steel corrosion, mm/year | 0.01 | 0.5 |
| 3. Consumption per mln · m$^3$ of gas, kg | 11.2 | |
| 4. Antifoaming properties | inhibits foam formation at concentrations 7-10 mg/l | stimulate foam formation |
| 5. Solubility in hydrocarbons | unlimited | dissolves with precipitation "—" |
| 6. Solubility in water | partially dissolves; forms a stable emulsion | |
| 7. Thermal stability | is not resinified up to 250° C. | is resinified and coked at temperatures above 100° C. |
| 8. Volatility | Vapour pressure 4 × 10$^{-7}$ mm Hg | nonvolatile |
| 9. Viscosity, centistokes | at 20° C. - 8.5 40° C. - 4.9 60° C. - 3.1 | 900-1000 |
| 10. Temperature of flowability loss, °C. | minus 50 | minus 7 |

Data on the effect of the proposed inhibitor on plastic properties of carbon steel and on hydrogen absorption in 0.5% solution of sodium chloride acidified with acetic acid to pH=3-4 and saturated with hydrogen sulphide (1200-1300 mg/l) are given in Table 2.

TABLE 2

| Concentration of the proposed inhibitor, g/l | Hydrogen content, cm$^3$/100 g | Plasticity, % |
|---|---|---|
| — | 11.0 | 5.0 |
| 0.01 | 11.0 | 5.0 |
| 0.03 | 0.11 | 100.0 |
| 0.05 | 0.11 | 100.0 |

Table 3 presents data on testing the inhibitor in a gaseous phase containing methane, hydrogen sulphide, and carbon dioxide.

TABLE 3

| Total pressure in the system, at | Pressure of H$_2$S, at. | Pressure of CO$_2$ at. | Temperature, °C. | Protective effect, % |
|---|---|---|---|---|
| 50.0 | 3.0 | 2.0 | 30 | 85-95 |
| 50.0 | 3.0 | 2.0 | 50 | 80-85 |

The results of industrial trials of the inhibitor for corrosion proofing and hydrogen embrittlement protection properties on an operating gas compressor handling raw unpurified gas with a hydrogen sulphide content of up to 2% are given in Tables 4 and 5.

TABLE 4

| Without inhibitor | | With inhibitor | | |
|---|---|---|---|---|
| conditions | | corrosion rate, | conditions, | | corrosion rate, | Protective |
| atm | °C. | mm/year | atm | °C. | mm/year | effect, % |
| 7 | 20 | 0.9 | 7 | 40 | 0.07 | 92 |
| 16 | 20 | 3-5 | 16 | 40 | 0.3 | 90-95 |

TABLE 5

| Characteristics of the sample | initial samples | without inhibitor | with inhibitor |
|---|---|---|---|
| ultimate strength σ, kg/mm$^2$ | 45.0 | 40.8 | 45.9 |
| relative elongation δ, % | 22.0 | 14.1 | 21.8 |
| relative narrowing ψ, % | 64.0 | 39.0 | 66.4 |

Comparative protective characteristics of the proposed and known inhibitors are given in Table 6.

TABLE 6

| Inhibitor | concentration g/l | plasticity, % | hydrogen amount, cm$^3$/100 g | corrosion rate, g/m$^3$ · hr |
|---|---|---|---|---|
| proposed inhibitor | 0.03 | 100 | 0.11 | 0.09 |
| Visco-904 produced by "Nalco", USA | 0.03 | 2.5 | 6.57 | 1.44 |
|  | 0.1 | 11.6 | 6.06 | 0.44 |
|  | 0.5 | 84.3 | 0.32 | 0.11 |
| Norust-9M produced by "CEKA", France | 0.03 | 14.0 | 1.92 | — |
|  | 0.1 | 95.0 | 0.21 | — |

The use of the present invention in petroleum, petroleum processing, and gas mining industry will provide a high economic effect due to an increase in reliability of equipment operation, reduction of repair work, and a rise in absolute service time of the equipment. The use of the invention will also reduce the losses of expensive absorbents employed in the purification of gas from hydrogen sulphide.

For a better understanding of the further objects and advantages of the present invention a description of the antifoaming inhibitor of hydrogen sulphide corrosion is given hereinbelow.

In the present invention an antifoaming inhibitor of hydrogen sulphide corrosion is proposed which is a compound of the general formula:

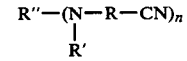

where R is a divalent normal or branched alkyl containing from 1 to 6 carbon atoms, n=1 or 2;
when n=1 R' and R" are identical or different radicals, namely, hydrogen, normal or branched alkyl containing from 1 to 20 carbon atoms, normal or branched alkenyl containing from 3 to 14 carbon atoms, oxyalkyl, containing from 1 to 20 carbon atoms, cycloalkyl containing from 5 to 6 carbon atoms; or R' and R" are -$(CH_2)_m$-, where m=2-10, -$(CH_2)_2$-NH-$(CH_2)_2$-, -$(CH_2)_2$-O-$(CH_2)_2$-; when n=2 R' is hydrogen, normal or branched alkyl containing from 1 to 20 carbon atoms, normal or branched alkenyl containing from 3 to 14 carbon atoms; R" is -$(CH_2)_k$- where k=2-10, -$(CH_2)_2$-NH-$(CH_2)_2$.

It is assumed that introduction of functional groups into the molecule of nitrogen-containing compound can improve protective characteristics of the compound due to either enhanced adsorption of the molecule or appearance of the second adsorption center.

Thus, since the proposed inhibitor contains two functional polar groups different in nature, which serve as hydrophilic centers and a hydrocarbon radical whose length affects the hydrophobic properties of the compound, such a structure features high protective properties and antifoaming ability at the same time.

The proposed inhibitor can be obtained by a method, for example, by following the procedure described (D. S. Breslow and C. R. Hauser, JACS, vol. 67, pp 686–687 (1945).

It has been established experimentally that the inhibitor proposed in the present invention should be used in concentrations equal to 10 mg/l–1 mg/l.

The inhibitor of hydrogen sulphide corrosion and hydrogen absorption proposed in the present invention possesses antifoaming properties and suppresses foam formation.

In addition, the proposed inhibitor has a high protective action against corrosion and hydrogen absorption both in liquid and gaseous phases, is not accumulated in working solutions, and the presence of the inhibitor in working solutions does not affect the quality of the final product.

For a better understanding of the present invention specific examples are given by way of illustration.

EXAMPLE 1

The fold technique is used for evaluating plastic properties of steel in a hydrogen sulphide medium. The plasticity of the sample is expressed by a percent ratio of the fold numbers which the sample withstands in an initial state to those after exposure in hydrogen sulphide.

As a corrosion medium use is made of 0.5% solution of NaCl acidified with acetic acid to pH=3.6 and saturated with hydrogen sulphide to 1500–1700 mg/l.

The samples of carbon steel 110X8X0.3 mm in size are degreased with Vienna lime, washed carefully with water and alcohol, then placed into a cell and poured over with a solution saturated with hydrogen sulphide containing different amounts of the inhibitor. The exposure time of the samples is 2 hours, temperature of the solution is 20° C.

As the inhibitor use is made of the compound of the formula: [CN$(CH_2)_3$NH]-$(CH_2)_2$NH$(CH_2)_2$[NH$(CH_2)_3$CN]-diethylenetriamine-N,N'-dibutyronitrile.

| concentration of the inhibitor, g/l | 0.005 | 0.05 | 0.5 |
|---|---|---|---|

-continued

| plasticity, % | 11 | 30 | 92 |
|---|---|---|---|

EXAMPLE 2

The vacuum extraction method is used to evaluate the degree of hydrogen absorption of carbon steel in 0.5% solution of NaCl acidified with acetic acid to pH=3.6 and saturated with hydrogen sulphide up to 1500–1700 mg/l in the presence of the inhibitor. The method resides in that the sample after hydrogen absorption in hydrogen sulphide medium is placed into a sealed vessel preliminarily evacuated to a pressure of $10^{-6}$ mm Hg and heated up to 400° C. The amount of gases liberated upon heating the sample in vacuum is evaluated by pressure change, the volume of the vacuum part of the system being constant. Concentration of hydrogen absorbed with steel is expressed in $cm^3/100$ g.

As the inhibitor use is made of the compound of the formula:

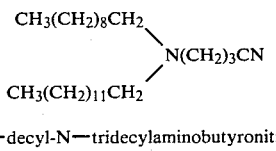

N—decyl-N—tridecylaminobutyronitrile

| Concentration, g/l | 0.01 | 0.03 | 0.05 |
|---|---|---|---|
| Amount of hydrogen absorbed, cm/100 g | 5.98 | 2.24 | 0.19 |

EXAMPLE 3

To evaluate the protective properties of inhibitors in a liquid phase, use is made of 0.5% solution of NaCl acidified with acetic acid to pH=3.6 and saturated with hydrogen sulphide to 1500–1700 mg/l. The rate of carbon steel corrosion was estimated by the weight method, testing time 6 hrs, temperature 20° C.

Diethylaminoacetonitrile of the formula $(C_2H_5)_2NCH_2CN$ was used as an inhibitor.

| Inhibitor concentration, g/l | 0.005 | 0.05 | 0.1 | 0.5 | 1.0 |
|---|---|---|---|---|---|
| corrosion rate, mm/year | 7.22 | 0.20 | 0.19 | 0.17 | 0.04 |

EXAMPLE 4

The protective properties from corrosion and hydrogen absorption are evaluated in 3% NaCl solution acidified with acetic acid and saturated with hydrogen sulphide to 1500–1700 mg/l; pH of the solution is 3.63. The corrosion rate is evaluated by the weight method; the degree of hydrogen absorption by a change in steel plasticity and amount of hydrogen absorption. Testing time 6 hours; temperature 20° C.

Monoethanolaminopropionitrile of the formula HOCH$_2$CH$_2$ NHCH$_2$CH$_2$CN is used as an inhibitor.

| Concentration, g/l | Plasticity, % | Amount of hydrogen absorbed, cm$^3$/100 g | Corrosion rate, g/m$^2$ hr |
|---|---|---|---|
|  | 100 | 0.11 | 0.7 |
| 0.005 | 3.4 | 6.56 | 0.28 |

| Concentration, g/l | Plasticity, % | Amount of hydrogen absorbed, cm³/100 g | Corrosion rate, g/m² hr |
|---|---|---|---|
| 0.05 | 34.8 | 1.75 | 0.13 |
| 0.5 | 96.2 | 0.13 | 0.07 |
| 1.0 | 100 | 0.10 | 0.04 |

EXAMPLE 5

Protective properties from corrosion and hydrogen absorption are evaluated in 3% NaCl solution containing 30% of methanol and 1000 mg/l of hydrogen sulphide at pH=4.5–5.0.

The tests have been conducted on samples of carbon steel; testing time 2 hours.

N,N′-Diacetonitrilehexamethylenediamine of the formula CNCH$_2$NH(CH$_2$)$_6$NHCH$_2$CN is used as an inhibitor.

| Inhibitor concentration, g/l | Plasticity, % | Amount of hydrogen absorbed, cm³/100 g | Corrosion rate, g/m² hr |
|---|---|---|---|
| 0.05 | 90 | 0.2 | 0.035 |
| 0.1 | 100 | 0.12 | 0.03 |
| 0.4 | 100 | 0.12 | 0.03 |

EXAMPLE 6

The degree of hydrogen absorption of carbon steel is evaluated by a change in plastic properties in a gaseous phase saturated with hydrogen sulphide at atmospheric pressure and a temperature 20° C.

A film of inhibitor is applied to the samples which are kept in a corrosion medium for 5 hours after which the plastic properties of the samples are determined.

Ethylenediamine-N,N′-dipropionitrile of the formula CNCH$_2$CH$_2$NH-(CH$_2$)$_2$NHCH$_2$CH$_2$CN is used as an inhibitor.

Plasticity of the samples retained by 90–95%.

Antifoaming properties were evaluated by destruction of a foaming solution column (of a given volume) obtained when passing an air through the solution at a preset speed.

Antifoaming effect (AFE) is calculated by the formula (I. N. Kamenskaya et.al. The Inventor's Certificate of the USSR No.269030):

$$AFE = \frac{H_s - H_f}{H_s - H_{dw}} \cdot 100\%, \text{ where}$$

$H_s$ is the height of the rise of the foaming solution,
$H_f$ is the height of the rise of the foaming solution with added foam suppressor,
$H_{dw}$ is the height of the rise of distilled water.

Measurements are conducted when the speed of passing air is 0.16 m/sec and the concentration of the inhibitor-foam suppressor is 0.05–0.1 g/l.

EXAMPLE 7

20% aqueous solution of monoethanolamine is used as a foaming solution.

Propylenediamine-N,N′-dipropionitrile of the formula

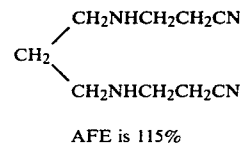

AFE is 115%

EXAMPLE 8

The foaming agent is a 20% aqueous solution of diethanolamine.

Dibutylaminoacetonitrile of the formula (n-C$_4$H$_9$)$_2$NCH$_2$CN is used as an inhibitor. AFE is 100%.

EXAMPLE 9

Protective properties of the inhibitor from corrosion and hydrogen absorption of carbon steel samples are evaluated by following the procedure described in Examples 1 and 2.

Piperidinobutyronitrile of the formula

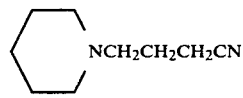

taken in concentration 1 g/l is used as an inhibitor.
Protective characteristics:
plasticity—99.9%.
hydrogen amount—0.12 cm³/100 g.

EXAMPLE 10

Protective properties of the inhibitor from corrosion and hydrogen absorption of carbon steel samples are evaluated by following the procedure described in Example 1 and 2. Morpholylcapronitrile of the formula

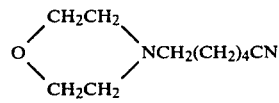

taken in concentration 5 g/l is used as an inhibitor.
Protective characteristics:
plasticity—99.9%,
hydrogen amount—0.12 cm³/100 g.

EXAMPLE 11

Protective properties of the inhibitor from corrosion of carbon steel samples are evaluated by following the procedure described in Example 1. Ethyleneiminoisobutyronitrile of the formula

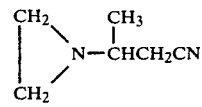

taken in concentration 0.5 g/l is used as an inhibitor.
Protective properties:
plasticity–86%,

EXAMPLE 12

Protective properties of the inhibitor from corrosion and hydrogen absorption of the samples from carbon steel are evaluated by following the procedure described in Examples 1 and 2. Hexamethyleneiminopropionitrile of the formula

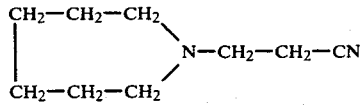

is used as an inhibitor; its concentration is 0.7 g/l.
Protective properties:
plasticity—99.9%.
hydrogen amount—0.11 cm$^3$/100 g.

EXAMPLE 13

Protective properties of the inhibitor from corrosion and hydrogen absorption of the samples from carbon steel are evaluated by following the procedure described in Example 1 and 2. N-dodecylaminoacetonitrile of the formula n-CH$_3$(CH$_2$)$_{10}$CH$_2$NHCH$_2$CN in concentration 0.03 g/l is used as an inhibitor.
Protective properties:
plasticity—99.8%,
hydrogen amount—0.18 cm$^3$/100 g.

EXAMPLE 14

Protective properties of the inhibitor from corrosion and hydrogen absorption of the samples from carbon steel are evaluated by following the procedure described in Example 1,2 and 3. Dicyclohexylaminoisobutyronitrile of the formula

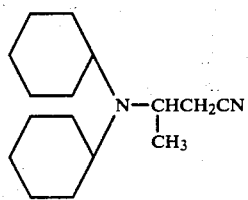

taken in a concentration 0.8 g/l is used as an inhibitor.
Protective properties:
plasticity—99.8%,
hydrogen amount—0.13 cm$^3$/100 g,
corrosion rate—0.04 g/m$^2$hr.

EXAMPLE 15

Protective properties of the inhibitor from corrosion and hydrogen absorption of the samples from carbon steel are evaluated by following the procedure described in Examples 1,2 and 3. α-/β'-oxyethylamino/-isobutylronitrile of the formula

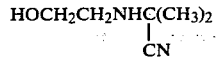

in a concentration 0.5 g/l is used as an inhibitor.
Protective properties:
plasticity—96.2%,
hydrogen amount—0.13 cm$^3$/100 g,
corrosion rate—0.07 g/m$^2$hr.

EXAMPLE 16

Protective properties of the inhibitor from corrosion of carbon steel samples are evaluated by following the procedure described in Example 3. N-allyl-N-n-eicosylaminoacetonitrile of the formula

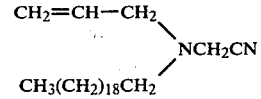

in a concentration 0.5 g/l is used as an inhibitor.
Protective properties:
corrosion rate—0.46 g/m$^2$hr.

EXAMPLE 17

Protective properties of the inhibitor from corrosion and hydrogen absorption of carbon steel samples are evaluated by following the procedure described in Examples 1,2, and 3. N-n-heptyl-N-n-nonylaminopropionitrile of the formula

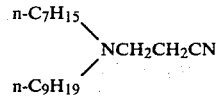

taken in a concentration 0.03 g/l is used as an inhibitor.
Protective properties:
plasticity—99.9%,
hydrogen absorption—0.12 cm$^3$/100 g,
corrosion rate—0.02 g/m$^2$hr.

EXAMPLE 18

Protective properties of the inhibitor from corrosion and hydrogen absorption of the carbon steel samples are evaluated by following the procedure described in Examples 1 and 3. Diallylacetonitrile of the formula

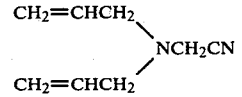

in a concentration 1 g/l is used as an inhibitor.
Protective properties:
plasticity—98.2%,
corrosion rate—0.07 g/m$^2$hr.

EXAMPLE 19

Protective properties of the inhibitor from corrosion and hydrogen absorption of the carbon steel samples are evaluated by following the procedure described in Example 1,2, and 3. Undecene-2-yl-aminoacetonitrile of the formula

C$_8$H$_{17}$CH=CHCH$_2$NHCH$_2$CN in a concentration 0.03 g/l is used as an inhibitor.
Protective properties:
plasticity—99.8%
hydrogen amount—0.18 cm$^3$/100 g,
corrosion rate—0.2 g/m$^2$hr.

EXAMPLE 20

Protective properties of the inhibitor are evaluated on the carbon steel samples by following the procedure described in Examples 1,2, and 3. Didecene-5-yl-aminopropionitrile of the formula

in a concentration 0.05 g/l is used as an inhibitor.
Protective properties:
plasticity—98.1%,
hydrogen amount—0.19 cm³/100 g,
corrosion rate—0.01 g/m²hr.

EXAMPLE 21

Protective properties of the inhibitor are evaluated on the carbon steel samples by following the procedure described in Example 3. N-n-propyl-N-2,6-dimethyloctadecylaminocapronitrile of the formula

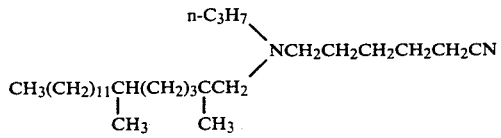

in a concentration of 0.8 g/l is used as an inhibitor.
Protective properties:
corrosion rate—0.29 g/m²hr.

EXAMPLE 22

Protective properties of the inhibitor are evaluated on the carbon steel samples by following the procedure described in Examples 1,2 and 3. Hexamethylenediamine-N,N'-dipropionitrile of the formula

in a concentration of 0.05 g/l is used as an inhibitor.
Protective characteristics:
plasticity 97%,
hydrogen amount—0.44 cm³/100 g,
corrosion rate—0.13 g/m²hr.

EXAMPLE 23

Protective properties of the inhibitor are evaluated on the carbon steel samples by following the procedure described in Examples 1 and 2. Ethylenediamine-N,N'-dibutyronitrile of the formula

in a concentration of 0.5 g/l is used as an inhibitor.
Protective characteristics:
plasticity—93%,
hydrogen amount—0.27 cm³/100 g.

EXAMPLE 24

Protective properties of the inhibitor are evaluated on the carbon steel samples by following the procedure described in Examples 1 and 2. As an inhibitor use is made of decamethylenediamino-N,N'-diacetonitrile of the formula

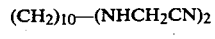

taken in a concentration of 0.05 g/l.
Protective properties:
plasticity—98%,
hydrogen amount—0.2 cm³/100 g.

EXAMPLE 25

Protective properties of the inhibitor are evaluated on the carbon steel samples by following the procedure described in Examples 1,2, and 3. As an inhibitor use is made of diethylenetriamine-N,N'-dipropionitrile of the formula

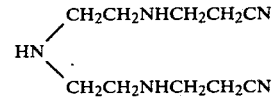

taken in a concentration of 0.1 g/l.
Protective properties:
plasticity—93%,
hydrogen amount—0.7 cm³/100 g,
corrosion rate—0.15 g/m²hr.

What we claim is:

1. A method for protecting steel and other ferrous metals against corrosion in hydrogen sulfide containing media, by contacting said metal with an effective amount of an organic inhibitor also exhibiting antifoam and foam suppressing activity and having the general formula:

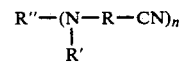

where R is a divalent normal or branched chain saturated hydrocarbon radical, containing from 1 to 6 carbon atoms, n is an integer equal to 1 or 2;
when n=1,
R' and R" are selected from the group consisting of hydrogen, normal or branched alkyl containing from 1 to 20 carbon atoms, normal or branched alkenyl containing from 3 to 14 carbon atoms, oxyalkyl, containing from 1 to 20 carbon atoms, and cycloalkyl containing from 5 to 6 carbon atoms; or when n=2, R' and R" are $-(CH_2)_m-$, where m = 2-10, or $-(CH_2)_2-NH-(CH_2)_2-$ or $-(CH_2)_2-O-(CH_2)_2-$;

R' is selected from the group consisting of hydrogen, normal or branched alkyl containing from 1 to 20 carbon atoms, and normal or branched alkenyl containing from 3 to 14 carbon atoms, R" is $-(CH_2)_k-$, where k=2-10, or $-(CH_2)_2-NH-(CH_2)_2-$.

2. The method of claim 1, wherein the metal is contacted with a liquid corrosive medium, having a concentration of inhibitor varying from 0.005 to 1 gram per liter.

3. The method of claim 1, wherein said inhibitor is selected from the group consisting of diethylenetriamine-N,N'-dibutyronitrile, decyltridecylaminobutyronitrile, diethylaminoacetonitrile, monoethanolaminopropionitrile, N,N'-diacetonitrilehexamethylenediamine, ethylenediamine-N,N'-dipropionitrile, propylenediamine-N,N'-dipropionitrile, and dibutylaminoacetonitrile.

4. The method of claim 1, wherein said inhibitor is selected from the group consisting of piperidinobutyronitrile, morpholylcapronitrile, ethyleneiminoisobutyronitrile, hexamethyleneiminopropionitrile, N-dodecylaminoacetonitrile, dicyclohexylaminoisobutyronitrile, α-(β'-oxyethylamino)-isobutyronitrile, N-allyl-N-didecylaminoacetonitrile, N-n-heptyl-N-n-nonylaminopropionitrile, and diallylacetonitrile.

5. The method of claim 1, wherein said inhibitor is selected from the group consisting of undecene-2-yl-aminoacetonitrile, didecene-5-yl-aminopropionitrile, N-n-propyl-N-2,6-dimethyloctadecylaminocapronitrile, hexamethylenediamine-N,N'-dipropionitrile, ethylenediamine-N,N'-dibutyronitrile, decamethylenediamino-N,N'-diacetonitrile, and diethylenetriamine-N,N'-dipropionitrile.

* * * * *